J. I. ARBOGAST.
METHOD FOR MAKING MACHINE FOOTED GLASSWARE.
APPLICATION FILED OCT. 4, 1907.

909,842.

Patented Jan. 12, 1909.

Witnesses
A. H. Rabsag,
R. H. Butter.

Inventor
John I. Arbogast
By
H. C. Everler
Attorneys

UNITED STATES PATENT OFFICE.

JOHN I. ARBOGAST, OF PITTSBURG, PENNSYLVANIA, ASSIGNOR OF ONE-HALF TO HENRY L. COLLINS, OF PITTSBURG, PENNSYLVANIA.

METHOD FOR MAKING MACHINE-FOOTED GLASSWARE.

No. 909,842.     Specification of Letters Patent.     Patented Jan. 12, 1909.

Application filed October 4, 1907. Serial No. 395,825.

*To all whom it may concern:*

Be it known that I, JOHN I. ARBOGAST, a citizen of the United States of America, residing at Pittsburg, in the county of Allegheny and State of Pennsylvania, have invented certain new and useful Improvements in Methods for Making Machine-Footed Glassware, of which the following is a specification, reference being had therein to the accompanying drawing.

This invention relates to a method of making machine footed glass-ware, and its object is to provide a method whereby a pressed glass article may be footed or provided with a supporting foot or base during the process of manufacture.

The formation of stems and feet upon glass-ware is both laborious and expensive, and the present invention aims to materially simplify the method of footing glass articles, thereby reducing the cost and lessening the time and labor in performing the work.

The method will be specifically described hereinafter, in connection with the accompanying drawing which forms a part of this specification, and its features of novelty will be set forth in the appended claims.

Figure 1:
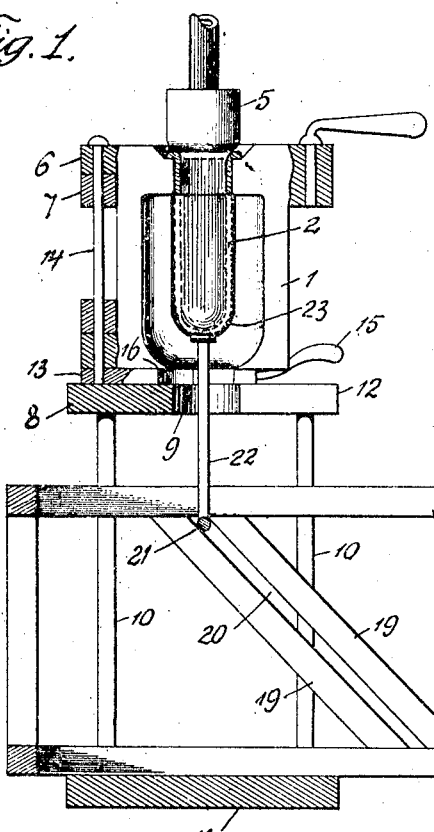
Figure 2:
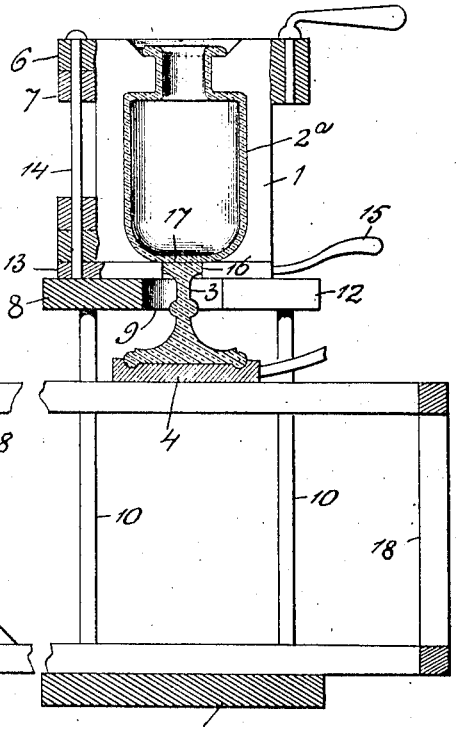
Figure 3:
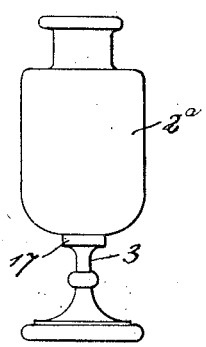

In the drawing:—Figure 1 is a sectional view of a mold containing a pressed blank; Fig. 2 is a similar view illustrating the pressed blank having been blown to form the body of the vessel and blown onto the foot of the vessel, and Fig. 3 is a side elevation of the completed article removed from the mold.

The reference numeral 1 designates a mold to receive a blank 2. I prefer to use a mold of the type disclosed in Letters Patent No. 260,819 granted to Philip Arbogast under date of July 11, 1882, which is recognized in the art as the basic patent on machine made glass articles.

The foot 3 is formed in any suitable mold and the improved method consists of the following steps to-wit: The pressed blank 2 is formed within a mold, and the foot 3 is simultaneously formed in its mold, after which the foot is removed from its mold, and placed upon a removable bottom-plate 4. The pressed bank is then positioned within the mold in which the body of the article is to be formed, and suitably supported until the mold is closed; the temporary support for the pressed blank is then withdrawn from the mold, the foot 3 is placed in position and the blow-head 5 lowered into the blow-hole of the mold 1, and the pressed blank then blown to form the body of the article and at the same time affix the same to the foot 3.

The distinguishing characteristic of the present invention, is that the pressed blank 2 is not removed from its mold, no "warming in" of said blank being required.

While the improved method is not restricted to the employment of any specific form of mold, I preferably employ the mold shown in Figs. 1 and 2, consisting of the hinged mold sections 6 and 7 resting upon a supporting plate 8 formed with a central opening 9 of sufficient diameter to permit the mold support to pass through it. The plate 8 is supported by standards 10 upon a base 11, and is formed at one side with a triangular slot 12 through which the foot 3 is inserted.

Above the plate 8 rests a sectional base plate 13 secured by the pivot pin 14 of the mold, and provided with a handle 15 to facilitate the required opening and closing movement of said mold plate 13. The plate 13 is also formed with a central opening 16 fitting the upper end 17 of the foot.

A horizontal movable frame 18 is supported upon the base 11, said frame being of rectangular spider form, and provided on opposite sides with inclined cleats 19 the spaces between which constitute guide-ways 20 to receive arms 21 projecting horizontally from a rod 22 the upper end of which is adapted to extend up into the mold 1, and carries a support 23 to receive the pressed blank 2.

In carrying out my improved method, the pressed blank 2 is placed in the support 23, and the mold 1 is then closed so as to support the pressed blank 2 from the neck thereof. The frame 18 is then moved longitudinally so as to withdraw the rod 22 and the support 23 from the mold, leaving the pressed blank supported by the neck thereof in the mold 1. The foot 3 is then placed in position and the sections of the plate 13 closed as shown in Fig. 2, after which the blow-head 5 is lowered into position as shown in Fig. 1 and the blank is then blown so as to form the body 2ª as shown in Fig. 2, and at the time of thus blowing the body, the same is caused to adhere to the foot 3, completing the article. The mold 1 and the sections of the plate 13 are then opened, and the finished article removed.

Having fully described my invention what I claim as new and desire to secure by Letters Patent is, 1. The herein described method of making footed or stemmed glass articles, which consists in forming a blank within a mold, forming the foot or stem in a separate mold, then suspending the blank in a mold with the foot or stem centered beneath the blank, and finally blowing the blank in the mold to form the body of the vessel and at the same time blowing it onto the foot or stem.

2. The herein described method of making footed or stemmed glass articles, consisting in forming a blank within a mold, suspending the blank in a mold, positioning a foot or stem beneath the blank, and then blowing the blank in the mold to form the body of the vessel and simultaneously blowing said body onto the foot or stem.

In testimony whereof I affix my signature in the presence of two witnesses.

JOHN I. ARBOGAST.

Witnesses:
F. C. ZERCHER,
F. O. McCLEARY.